United States Patent

Prahl

[15] 3,706,426

[45] Dec. 19, 1972

[54] CONTAINER WITH BRAKE FOR ENCLOSED REEL

[72] Inventor: Marvin E. Prahl, Longmont, Colo.

[73] Assignee: International Business Machines Corporation, Armonk, N.Y.

[22] Filed: Nov. 27, 1970

[21] Appl. No.: 93,320

[52] U.S. Cl. ..........242/198

[51] Int. Cl. ..........G11b 23/08

[58] Field of Search......242/198, 199, 200, 197, 194, 242/54.1, 71.2, 76; 274/4 C, 4 E, 11 C; 179/100.22

[56] References Cited

UNITED STATES PATENTS

| | | | |
|---|---|---|---|
| 2,424,498 | 7/1947 | Nygaard | 242/54.1 X |
| 2,401,632 | 6/1946 | Greenleaf | 242/54.1 |
| 2,676,766 | 4/1954 | Ross et al. | 242/76 |
| 3,236,468 | 2/1966 | Foret | 242/199 |

FOREIGN PATENTS OR APPLICATIONS

| | | | |
|---|---|---|---|
| 1,099,755 | 2/1961 | Germany | 242/198 |

*Primary Examiner*—George F. Mautz
*Attorney*—Hanifin and Jancin and Gunter A. Hauptman

[57] ABSTRACT

A cartridge stores a magnetic recording tape on two reels which are rotated when the cartridge is mounted on a drive spindle. Reels are prevented from turning inside the unmounted cartridge by a brake which is released when the cartridge is mounted. In one embodiment, the brake frictionally bears against the reel, and in another embodiment, fingers on the brake engage reel locking fingers. In both cases, the reel is released when the drive spindle disengages the brake from the reel.

2 Claims, 9 Drawing Figures

INVENTOR
MARVIN E. PRAHL
BY Gunter A. Hauptman
ATTORNEY

CONTAINER WITH BRAKE FOR ENCLOSED REEL

CROSS-REFERENCES

Different features of the cartridge and reels are shown in the following patent applications filed on even date herewith and assigned to the International Business Machines Corporation, Armonk, New York:

Ser. No. 93,345, "Magnetic Tape Cartridge," by E. G. Stahlberg, J. M. Tagawa, and J. H. Tiao; and Ser. No. 93,344, "Magnetic Tape Reel and Fastener," by L. Perko and E. G. Stahlberg.

BACKGROUND OF THE INVENTION

1. Field of the Invention

The invention generally relates to electronic data processing, and more particularly, to reels storing magnetic recording tape.

2. Description of the Prior Art

Webs such as magnetic or paper tape, photographic film, inked ribbons, etc. store or transfer information as web portions are moved past an information station by drive spindles which rotate storage reels. In an attempt to simplify insertion and removal of webs and reels into and from their operating positions, reel-mounted webs are often mounted in cartridges, magazines, cassettes, or similar containers which, additionally, protect the webs from external damage during storage apart from the operating mechanism. However, such cartridges create a problem not present when an entire web is stored on a single reel — the normal situation when a reel is removed from its drive spindle. A cartridge may be removed with part of the web wound on each reel. As a result, vibration, reel rotation, shock, etc. may cause relatively thin webs (especially magnetic recording tapes) to lose their inter-reel tension and accumulate in undesirable loops and kinks between the reel. In addition to damaging the web, such accumulation loses positional registration required in some precision utilization mechanisms.

In the prior art, this problem has been solved by frictionally restraining the reels to prevent undesired motion while permitting rotation against the frictional forces by drive spindles. However, frictional restraint during reel rotation places excessive loads on drive motors and gear trains requiring larger components and heat dissipation provisions undesirable in inexpensive and physically small devices. The prior art also shows restraining devices which are engaged during cartridge storage and disengaged when the cartridge is placed in its operating position. For example, a leaf spring for each reel may urge each reel against the bottom of the cartridge to frictionally restrain reel motion when the cartridge is not in use. The reels are moved away from the restraining cartridge bottom by their respective drive spindles when the cartridge is inserted in its operating position. This solution, however, introduces undesirably large transverse web motion and involves spring friction even when the cartridge is in its operating position. Also, in the prior art, one or more cantilevered springs urge a friction pad against each reel flange. An extra release spindle on the operating mechanism levers the spring out of flange contact when the cartridge is placed in operating position. However, this solution requires an extra spindle to utilize the leverage of the cantilevered spring and is most effective on the outer circumference of the reel flange. It is not effective with flangeless reels, often used in closed cartridges, because friction exerts insufficient force close to the reel center.

SUMMARY OF THE INVENTION

The invention overcomes the shortcomings of the prior art by restraining reel motion when the cartridge is not in use and completely releasing the restraining forces when the cartridge is inserted in its operating position, without any spindles in addition to the existing drive or support spindles.

A movable surface is urged by a spring into contact with a mating area on the hub surrounding each reel aperture. The contact of the two surfaces restrains motion of the reel. When the cartridge is placed on spindles, each spindle bears against the bottom of its respective movable surface to completely disengage it from contact with its reel. The only load added by the braking mechanism during cartridge operation is a small amount of friction between the spindle end and the movable surface bottom. The mating areas may be roughened for frictional contact, toothed for positive contact, etc. The invention is especially applicable to cartridges enclosing flangeless reels of thin magnetic recording tape, but is equally applicable to all spooled webs.

The foregoing and other features and advantages of the invention will be apparent from the following more particular description of the preferred embodiments of the invention, as illustrated in the accompanying drawings.

DETAILED DESCRIPTION OF THE PREFERRED EMBODIMENTS

Figure 1:
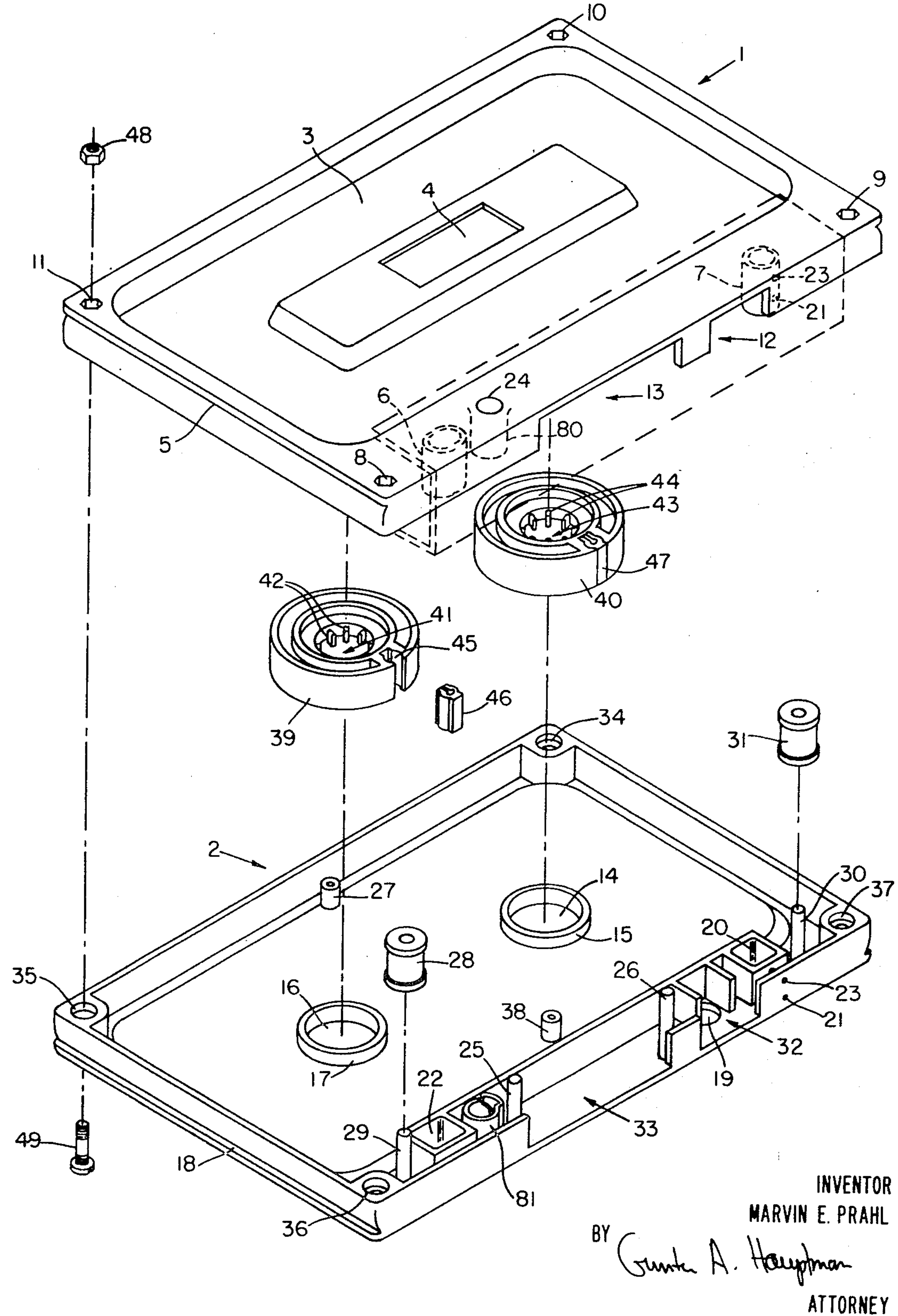
FIG. 1 is an exploded view of a complete cartridge.

Referring now to FIG. 1, a two-shell cartridge comprises a mating top shell 1 and bottom shell 2. As will be described subsequently, the shells 1 and 2 contain, when assembled, a web stored on two reels and accessible to a utilization device while stored in the assembled shells. A magnetic tape reader-recorder is an example of a utilization device in which information stored as magnetic indicia on the tape is accessed by linearly moving the tape past a magnetic head. Movement is imparted to the tape by rotating the reels or driving the tape with a capstan.

The top shell 1 has a depression 3 extending around the central portion of top shell 1 defining a window 4, which provides an external view of magnetic tape stored within the complete cartridge, and an outer flange intended to provide a base for other cartridges to facilitate stacking. The top shell 1 has an ejection edge 5 on each side of the shell (the opposing edge is not shown) for engaging an ejection mechanism in the utilization device operative to initiate ejection of the cartridge from the device. Alternatively, the edge 5 may be designated a holddown edge. Registration hole walls 6 and 7 mate with registration pins in the utilization device to align the complete cartridge when it is placed in the device. Holes 8 through 11 may be provided to receive fasteners and serve as file protection and storage cavities, as will be explained with reference to FIGS. 5A and 5B. An idler roller access opening 12 and a head guide access opening 13 are provided to give drive and control portions of the utilization device access to magnetic tape stored in the complete cartridge. Other opening shapes and functions may be required by different drive devices. A hole 24 and cylinder 80 may be provided to give an external view of a file-protect shaft to be described with reference to FIG. 5B.

Still referring to FIG. 1, the bottom shell 2 includes a first spindle access hole 14 having a first hub retainer periphery 15 and a second spindle access hole 16 having a second hub retainer periphery 17. The peripheries 15 and 17 receive reel hubs 39 and 40, and the apertures 14 and 16 give external access to reels, as will be explained. The bottom shell 2 has a hold-down edge 18 which mates with the ejection edge 5 of the top shell 1 and cooperates with a hold-down mechanism in the utilization device to fix the cartridge in position during use. Obviously, the functions of edges 5 and 18 may be reversed. A similar edge (not shown) is provided on the opposite side of the bottom shell 2. A capstan access hole 19 permits a capstan in the utilization device to contact the magnetic tape in the completed cartridge for imparting motion to the tape. The circular registration hole walls 6 and 7 in the top shell 1 mate with walls 22 and 20 in the bottom shell 2 to receive utilization device registration pins which correctly align the cartridge in the device. The generally circular walls 6 and 7 contact the inside walls of the rectangular and square receiver walls 22 and 20. The insertion of round hole walls in straight sided receptacles gives accurate registration without requiring precise manufacturing tolerances as would be needed for mated surfaces. Sensing holes 21 and 23 through walls 7 and 20 connect a light source to a light detector. A light source inserted in the wall 7, when the cartridge is placed on the pin, transmits a light beam through the sensing holes 21 and 23 when a transparent or punched portion of magnetic tape passes between the wall 20 and a sensing hole. In this way, the approach of the end of the magnetic tape (EWA) is indicated by holes punched in, or transparent areas, on the tape. Similarly, the beginning of the tape (BOT) and the end of the tape (EOT) may be recognized. Other functions are possible and, with minor modifications, reflective spots on tape may be detected. A single opening may replace holes 21 and 23. Wrap pins 25 and 26 and corner rollers 28 and 31 mounted on corner pins 29 and 30 define the tape path traveling between reels 39 and 40 past the sensing holes. Fastener holes 34 and 37 may fasten the top shell 1 to the bottom shell 2. Alignment pins 27 and 38, when mated with matching pins receivers (not shown) in top shell 1, provide additional aligning accuracy. Access openings 32 and 33 match openings 12 and 13 in the top shell 1. The key-shaped cylinder 81, mating with cylinder 80 of top shell 1 may be provided for file protection, as described with reference to FIG. 5B.

Still referring to FIG. 1, reel hubs 39 and 40, having depressions designed to fit around the peripheries 17 and 15, respectively, have central apertures 41 and 43 for receiving a drive spindle (shown in FIGS. 2 and 3) through the spindle access holes 16 and 14 of the bottom shell 2. Teeth 42 and 44 engage drive spokes on the spindles. Locking inserts 46 and 47 fasten an end of the magnetic tape to the reel hubs when placed in mating insert openings 45.

The top and bottom shells 1 and 2 are assembled, as shown in FIG. 1, by placing fasteners, such as bolt 49 and nut 48, through the holes 8–11 and 34–37 and securing the shells together. Alternatively, the shells may be glued together, dovetailed, ultrasonically bonded, riveted, etc. The complete cartridge is assembled with tape fastened and wound on the reel hubs 39 and 40 and distributed along the defined tape path. Undesired movement of the reels and tape is prevented by a brake assembly associated with each reel hub.

Two embodiments of a brake assembly will now be described with reference to FIGS. 2A and 2B and 3A and 3B. The first embodiment of the brake assembly, shown in FIGS. 2A and 2B in the fullyassembled cartridge, is a frictional brake permitting the reel hub to turn freely when the cartridge is in use. When the cartridge is not in use, the brake assembly frictionally engages the reel hub and prevents undesired motion. In the second embodiment, FIGS. 3A and 3B, the brake assembly provides a positive, as opposed to frictional locking action.

Figures 2A, 2B, 3A, 3B:
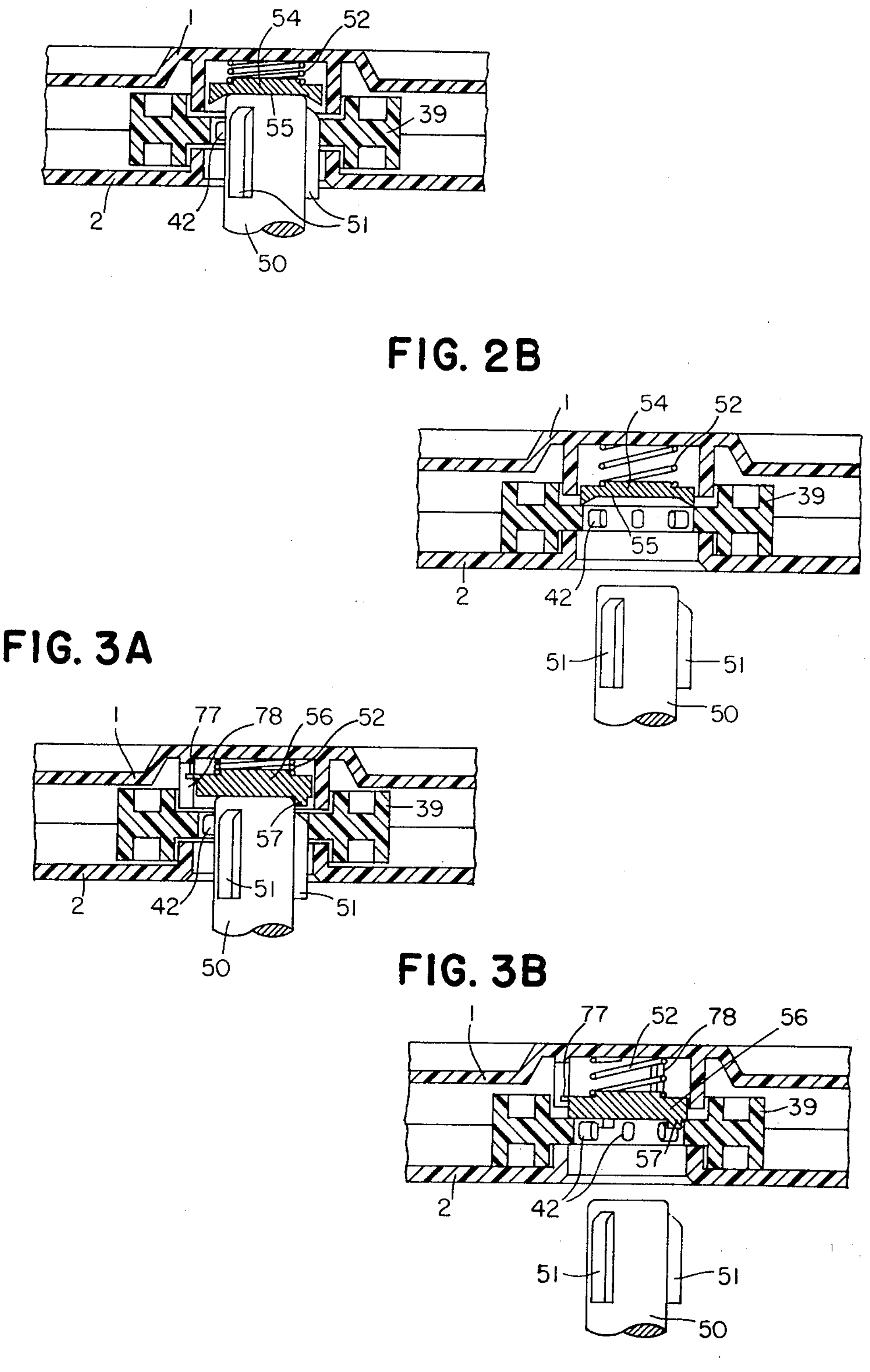
FIGS. 2A and 2B are cross-sections of the cartridge in FIG. 1, showing two modes of operation of one embodiment of a brake assembly.
FIGS. 3A and 3B are cross-sections of the cartridge of FIG. 1, showing two modes of operation of a second embodiment of a brake assembly.

Referring now to FIGS. 2A and 2B, the frictional embodiment of the brake assembly will be described with reference to hub 39 only. A similar brake is usually provided for the other hub. The top shell 1 and bottom shell 2 are assembled with the reel hub 39 in place, as shown. A spindle 50, having drive spokes 51, engages teeth 42 of the reel hub 39 to permit motion of, or impart motion to, the reel hub 39. When the cartridge is in the utilization device, as shown in FIG. 2A, a frictional brake pad 54, having a frictional surface 55, is disengaged from the reel hub 39 by the top of spindle 50 against the compression of a spring 52. When the cartridge is removed from the utilization device, as shown in FIG. 2B, the spindle 50 is withdrawn. The brake pad 54 is then pushed downward by the spring 52 to engage the reel hub 39 restraining motion of the reel hub by friction between the surface 55 and the top of the reel hub 39. While additional frictional forces occur on the bottom of the reel hub 39 against the inside surfaces of the bottom shell 2, they are not essential to restrain motion of the reel hub 39. The spacing between the periphery 17 and the mating periphery of the top shell 1 are exaggerated in FIGS. 2A and 2B to illustrate the operation, and the amount of vertical motion of the reel hub is much smaller than shown.

A positive lock brake assembly will now be explained with reference to FIGS. 3A and 3B. When the cartridge is placed on the spindle 50, as shown in FIG. 3A, the brake pad 56 is moved out of any engagement with the hub 39 against the compression of spring 52. The vertical motion of the brake pad 56 occurs in a line determined by vertical slots 78 in the top shell 1 and fingers 77 on the pad 56. The combination of slots 78 and fingers 77 prevents rotation of the pad 56 when the spindle 50 rotates. Referring to FIG. 3B, when the cartridge is removed from the spindle 50, the pad 56 is moved downward by the spring 52 to cause teeth 57 on the pad 56 to engage teeth 42 on the reel hub 39. The anchoring action of the fingers 77 and slots 78 positively lock the reel hub 39 against rotation either immediately or after a subsequent small movement of the hub.

Figure 4A:
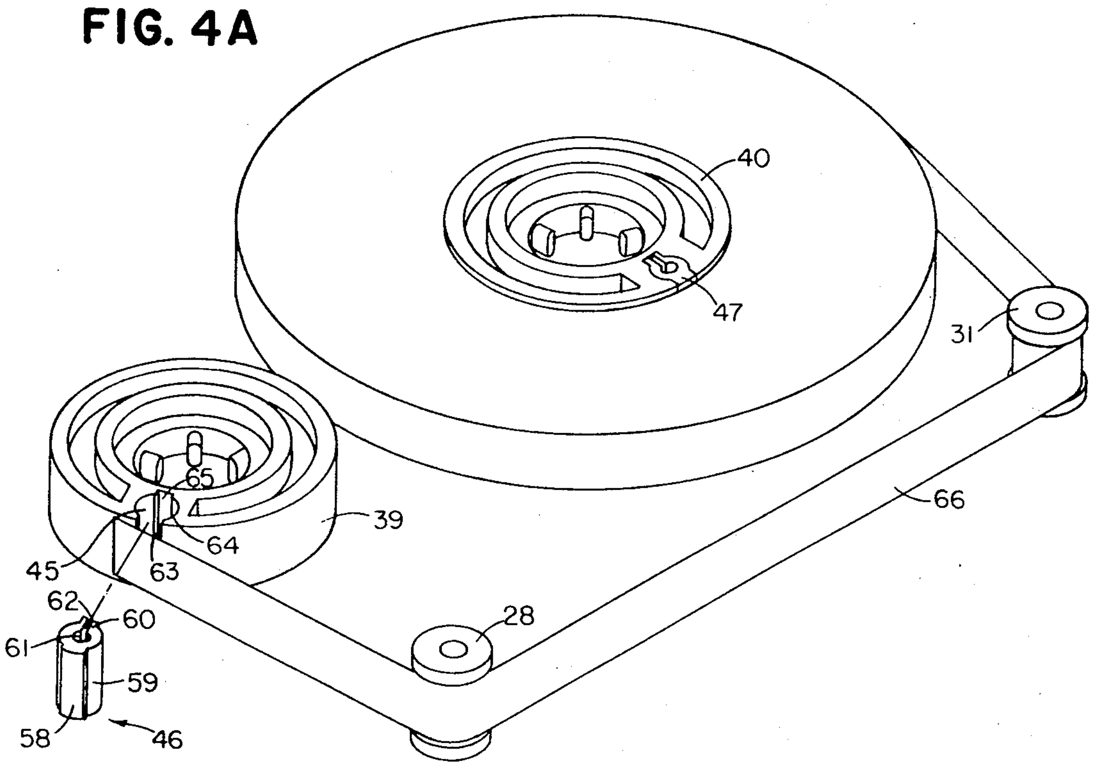
FIG. 4A is a detail view of the cartridge of FIG. 1, with tape in position, showing one embodiment of an insert usable in the invention.

Two embodiments of an insert for anchoring the tape to the reel hub will now be described with reference to FIGS. 4A and 4B. In both embodiments, the insert is designed for easy insertion by automatic machinery and positive locking under tape tension. Any resilient or compressible material may be used. Referring first to FIG. 4A, the magnetic tape 66 is wound around reel hubs 39 and 40 and anchored to them by inserts 46 and 47, respectively. The tape 66 path is in part determined by corner rollers 28 and 31. The insert 46 is pushed into aperture 45 after the end of the tape 66 is stretched across the opening 63 of the aperture 45. This forces the tape end to assume the shape of the inside of the aperture 45. The insert 46 has a top 58 and a bottom 60, both of which are smaller than a middle portion 59. A circle 61 and slot 62 increase the resiliency of the insert 46 and is not required if a sufficiently resilient material is used. When the insert 46 is pushed into the aperture 45, the middle portion 59 is squeezed through the opening 63 until it mates with the corresponding recess 64. The insert bottom 60 will mate with the corresponding aperture bottom 65. The tape 66, jammed between the insert and the inside surface of the aperture 45 will, under tension, tend to rotate the insert 46 inside the aperture 45. The rotation jams the tape between the corresponding bottoms 60 and 65 preventing slippage of the tape.

Figure 4B:
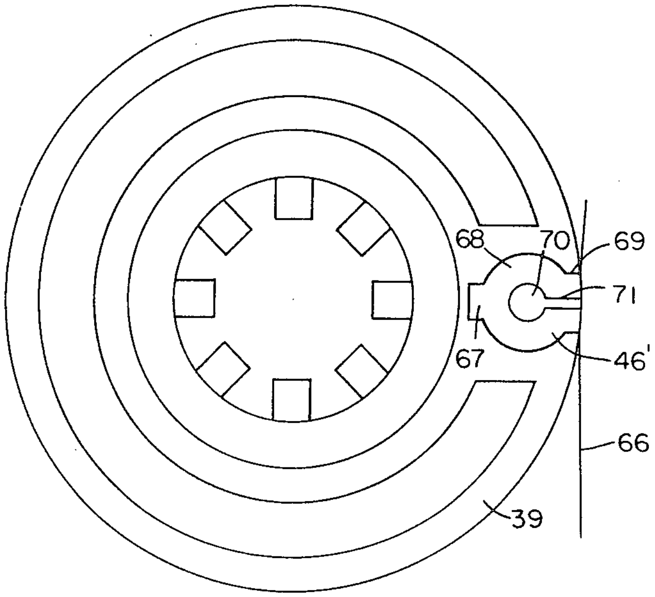
FIG. 4B is a plan view showing a second embodiment of an insert.

Another version of the insert is shown in FIG. 4B. The insert 46' is shown in place with the tape end jammed into its mating recess in the reel hub 39. The insert 46' has a bottom portion 67, a middle portion 68, and a top portion 69. A central circle 70 and slot 71 provide resiliency. The construction and operation of the insert 46' is essentially identical to the insert 46, just described. It will be noted that the major difference is the position of the slot 71 at the top portion 69, as opposed to the bottom.

Figure 5A:
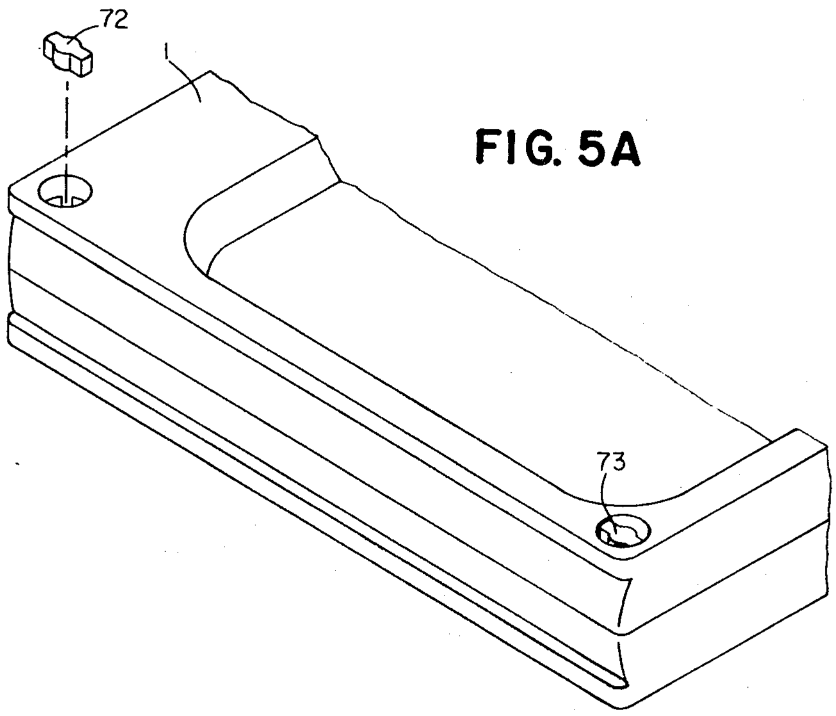
FIG. 5A is a detail of one end of the cartridge showing file protection pins.
Figure 5B:
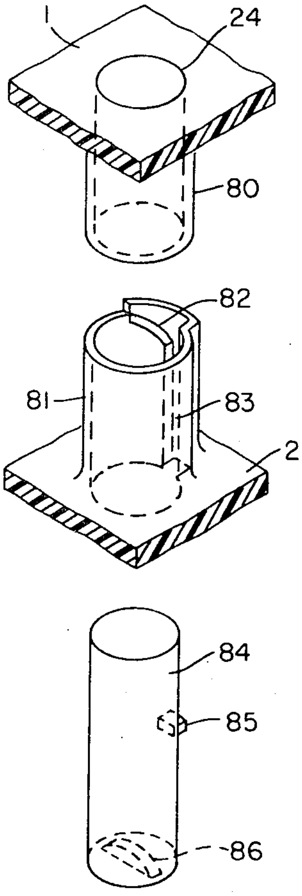
FIG. 5B shows another embodiment of a file protection device.

File protection provisions will now be described with reference to FIGS. 5A and 5B. File protection may be provided, for example, in any of the eight recessed fastener holes, in a number of ways. In FIG. 5A, a screw-head is shown in a recessed fastener hole for illustration. A file protection member 72 is placed in the hole above the fastener. The presence of the file protection member 72 in the hole indicates to the utilization device that the cartridge may be used (for example) for reading only and, thus, protects the information recorded on the tape from destruction. When the file protection member 72 is removed from the hole permitting recording on the tape, it may be stored in another hole. This is illustrated by file protection member 73. Alternatively, as shown in FIG. 5B, file protection may be accomplished by a file protection shaft 84, stored in cylinder 81, which is withdrawn to indicate (for example) that recording is not permitted and inserted to permit recording. The position of shaft 84 is visible through hole 24. This embodiment obviates the need for storing unused file protection members. The file protection shaft includes a tooth 85 which slides in slot 83 and holds shaft 84 in locked position when it passes over cam surface 82 under external force applied to slot 86.

While the invention has been particularly shown and described with reference to preferred embodiments thereof, it will be understood by those skilled in the art that various changes in form and details may be made therein without departing from the spirit and scope of the invention.

What is claimed is:

1. In a machine-mountable cartridge for storing a flexible web on a reel, having a central aperture for receiving a shaft when the cartridge is mounted for use, means for maintaining reel position when the shaft is not present in the aperture, comprising:

a first circular reel braking structure integral with the reel, surrounding the reel aperture and having inwardly extending fingers;

a second separate circular braking structure having downwardly extending fingers operable to mate with the fingers of the first structure, for mating with said first structure, movable into, and out of, engagement with said first reel braking structure; and elastic means, contracting the second structure for restraining rotation of the second structure and for urging the first and second structures into engagement only when the shaft is not present in the reel aperture.

2. In a cartridge storing flexible magnetic recording tape on two flangeless reels, intended for insertion into a magnetic tape drive having spindles for engaging reel apertures, two brakes, one for each reel, for maintaining tape tension between the reels when the cartridge is not inserted in the drive, each comprising:

a toothed disc, positioned in said cartridge above the reel aperture, movable, along a line through the aperture center, upward when the spindle is present in the reel aperture and downward when it is not;

a toothed surface, integral with the reel and surrounding the reel aperture, for mating with the toothed disc when it is moved into engagement with it; and a spring, mounted between the inside cartridge surface and the top of the toothed disc to urge the disc downward into mating contact with the reel surface when the spindle is not present in the reel aperture.

* * * * *

PO-1050
(5/69)

UNITED STATES PATENT OFFICE

CERTIFICATE OF CORRECTION

Patent No. 3,706,426 Dated December 19, 1972

Inventor(s) Marvin E. Prahl

It is certified that error appears in the above-identified patent and that said Letters Patent are hereby corrected as shown below:

Column 6, line 38, "contracting" should read --contacting--.

Signed and sealed this 29th day of May 1973.

(SEAL)
Attest:

EDWARD M.FLETCHER,JR.
Attesting Officer

ROBERT GOTTSCHALK
Commissioner of Patents